May 10, 1966   A. H. KASBERG   3,250,588
METHOD OF PRODUCING URANIUM CARBIDE
Filed April 2, 1963
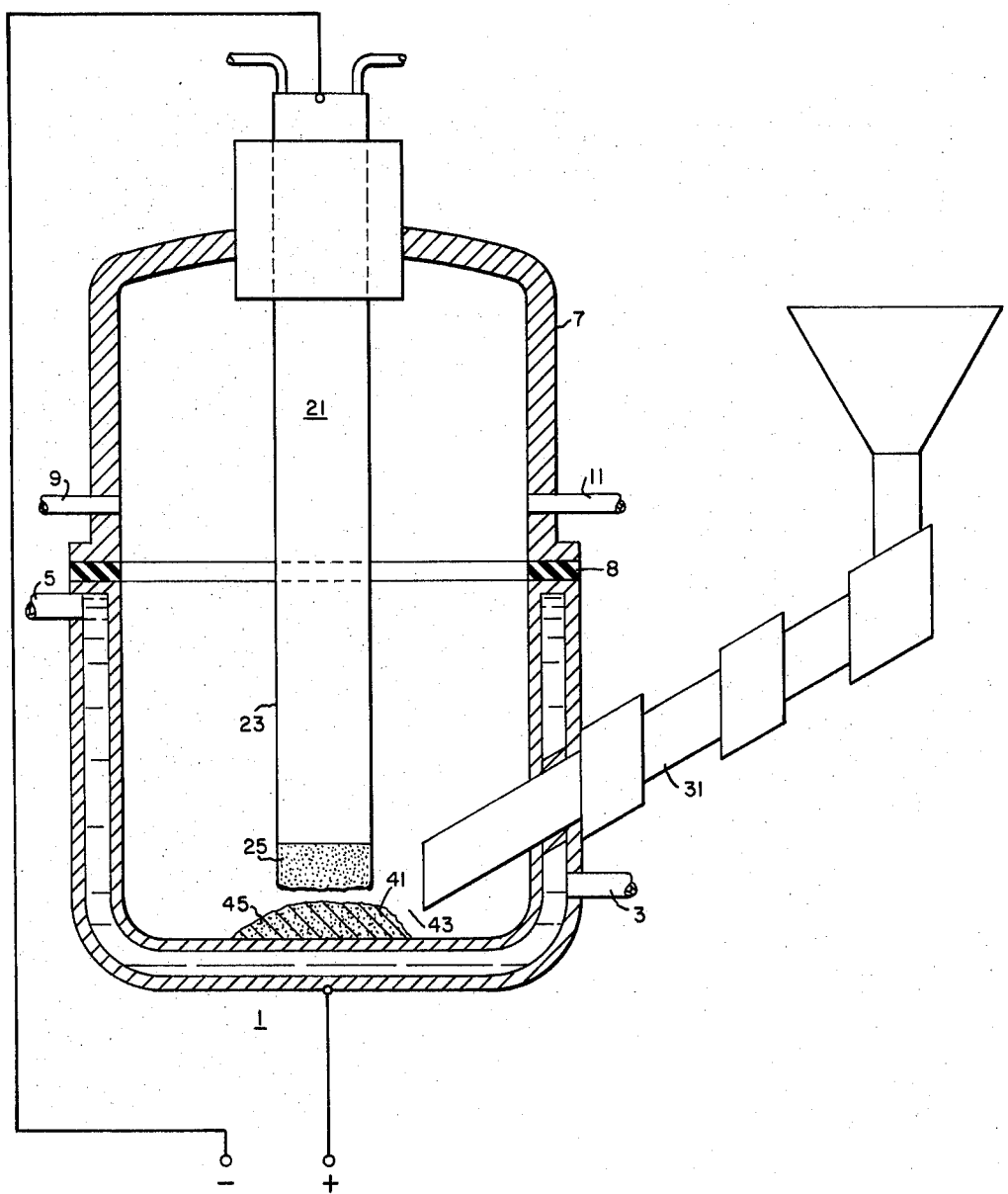

United States Patent Office 3,250,588
Patented May 10, 1966

3,250,588
METHOD OF PRODUCING URANIUM CARBIDE
Alvin H. Kasberg, Murrysville, Pa., assignor to Nuclear Materials and Equipment Corporation, Apollo, Pa., a corporation of Pennsylvania
Filed Apr. 2, 1963, Ser. No. 269,931
7 Claims. (Cl. 23—14.5)

This invention relates to the art of manufacturing products by chemical reaction and has particular relationship to the production of the carbides of uranium.

The most commonly known carbides of uranium are uranium monocarbide, UC, uranium bicarbide $UC_2$ and the carbide $U_2C_3$. In addition, there are intermediate carbides, designated $UC_x$ where $x$ is a fraction. A typical such carbide is $UC_{0.9}$.

It has been discovered that uranium carbides have a very high density; UC has a density of about 13.63 grams per cubic centimeter, $UC_2$, 11.28 and $U_2C_3$, 12.88. This high density lends the carbides of uranium marked advantages as fuel for nuclear reactors and for other purposes but it is essential for any carbide which is to serve such a purpose or a related purpose that it be in the form of a compact solid and not porous. It is an object of this invention to provide a method of producing compact non-porous solids composed of uranium carbide.

Attempts have been made to produce uranium carbide both by reacting a mass of uranium oxide and carbon at a high temperature in a furnace and by reacting the oxide and the carbon in an arc produced between a non-consumable electrode and a collecting electrode. In the latter case a button or block of the oxide and carbon is placed on a hearth and an arc is fired between a non-consumable electrode and the hearth. The product of the reactions in accordance with the prior art both in the furnace and the arc has been found to be impure and porous. It is another object of this invention to overcome the difficulties of the prior art methods.

In accordance with this invention in its broader aspects, the carbide is produced by arc reaction but the reacting material is fed gradually into the arc. In practicing this aspect of the invention it has been found that the rate at which the material can be fed to produce the desired high quality carbide is limited by the effect of the material in the arc. It has been found that if the material is fed at too high a rate, the arc is highly unstable causing the material to spatter and in other ways preventing a useful reaction. The instability can be suppressed by feeding the material slowly but this leads to a low rate of production of the carbide. It is a specific object of this invention to overcome this difficulty.

This invention in its specific but highly important aspects arises from the discovery that the instability of the arc in the arc reaction is caused by the presence of the gas which is emitted in large quantities during the uranium oxide-carbon reaction. This gas is predominately carbon monoxide.

In accordance with this aspect of the invention carbides of uranium are produced by carrying out two successive reactions starting with a mixture of uranium oxide and carbon. The first reaction is carried out in a furnace under vigorous pumping which continuously removes the gas formed. The product of this reaction is a substantially gas-free porous material predominately of uranium carbide. The second reaction is carried out in a non-consumable-electrode arc. The product of the first reaction is broken up and continuously fed into the arc where it is converted into a compact solid. It has been discovered that because the emission of gas in the second reaction is minimal, the arc, even if the arc-current is high, is stable and quiet and reliably produces a compact carbide. In accordance with the specific aspects of this invention, the region of the arc is pumped to remove any residual gas. In accordance with the broader aspects of this invention, the pumping in the arc reaction may be dispensed with where the product of the first reaction is such that the production of residual gas in the arc is low.

In the specific practice of this invention, a mass comprising uranium oxide, carbon and a binder is made up. Specifically the binder is a hydrocarbon such as furfural resin. The quantity of carbon is so set that it is stoichiometrically related to the uranium oxide in the material which takes part in the reactions. The related amounts of oxide and carbon may be determined from the appropriate chemical equation. For UC this equation is

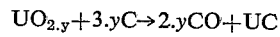

where $y$ is a number representing the decimal of oxygen more than 2 in the oxide. Thus $U_3O_8$ can be written $UO_{2.67}$. It has been found in actual practice that $y$ may have a wide range of magnitudes. Where an intermediate carbide is desired, the equation may be written

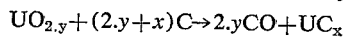

For $UC_{0.9}$ this equation becomes

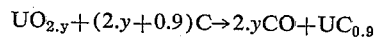

The binder is included in accordance with the specific aspects and the preferred practice of this invention to facilitate the handling of the uranium oxide-carbon mixture. Where facilities are provided for handling the mixture without a binder, the binder may in accordance with the broader aspects of this invention be dispensed with.

The mass including the binder produced as just described is heated to a high temperature to decompose the binder. Specifically the mass is heated in a furnace in a vacuum or in inert gas at about 900° C. until the binder is decomposed.

The product of the last-mentioned heating may in the practice of the broader aspects of this invention then be reacted in an arc at a low rate but preferably it is subject to the first reaction. This first reaction takes place in a vacuum or in an inert gas atmosphere at a temperature of about 2000° C. to 2300° C. with pumping equipment operating continuously to remove the gas generated by the reaction. The time of this reaction depends on the magnitude of the mass being heated and is typically between one and five hours for large masses.

The product of this first reaction is particled and subjected to the second reaction in a non-consumable-electrode arc. The arc is typically produced in a closed container having a water-cooled hearth which may be composed of copper or other suitable material. An arc is fired between a graphite water-cooled electrode and the hearth and the product of the first reaction is fed gradually into the arc and is converted into compact uranium carbide. The arc is in this case stable and the material may be fed at a high rate. The container is continuously pumped to remove residual gases. In accordance with the broader aspects of this invention the pumping may be dispensed with, particularly where the gases have been removed substantially completely during the first reaction.

For a better understanding of this invention, both as to its organization and as to its method of operation, together with additional objects and advantages thereof, reference is made to the following description of apparatus for practicing this invention taken in connection with the accompanying drawing, in which the single figure shows apparatus for producing the second reaction. The decomposition of the binder and the first reaction may take place in a conventional vacuum furnace.

The apparatus shown in the drawing includes a sealed container, the lower part of which is a double-walled hearth 1 of copper having inlet and outlet connections 3 and 5 for conducting cooling fluid. The upper part 7 of the container is of generally cup-shaped structure. The part 7 may be composed of stainless steel and is sealed vacuum tight to the hearth through electrically insulating gaskets 8. The upper part 7 has inlet and outlet connections 9 and 11 for exhausting and pumping out the container.

The apparatus includes a non-consumable electrode 21. This electrode consists of a fluid cooled body 23 having a carbide tip 25. The electrode 21 is sealed into the part 7 insulated therefrom and extends into the hearth. Suitably sealed facilities (not shown) are provided for setting the electrode so that the graphite tip 25 is properly spaced from the base of the hearth and suitable regulating equipment (not shown) may be provided for maintaining this setting.

The apparatus includes a conductor 31 for feeding the product of the first reaction into the arc which is sealed through the container. This conductor includes the usual valves for preventing air from leaking into the container.

In the use of this apparatus the container is evacuated and flushed out with inert gas. An arc is then fired and with the exhaust pumps in operation the material is fed through the conductor 31 and reacted in the arc.

*Example*

In the practice of this invention in its broader aspects in a typical case it was found by analysis that the atom ratio of the oxygen to the uranium of the oxide to be used was 2.18. The residual carbon derived from the thermal decomposition of the binder was determined to be between 49% and 50% of the weight of the binder.

The equation for the production of UC is $$UO_{2.18} + 3.18C \rightarrow 2.18CO + UC_{1.0}$$

| | |
|---|---|
| Atomic weight of U | 238 |
| Atomic weight of O | 16 |
| Molecular weight of $UO_{2.18}$ | 273 |
| Atomic weight of C | 12 |
| Weight of 3.18C | 38.2 |

$$\text{Percent UO } 2.18 = \frac{273}{311.2} = 87.7\%$$

$$\text{Percent C} = \frac{38.2}{311.2} = 12.3\%$$

A 3 kilogram batch was processed.

Weight of $UO_{2.18} = 2630$ grams

Approximately 25% of carbon required is supplied by binder.

| | Gm. |
|---|---|
| Total carbon required | 370 |
| Carbon or graphite in mix | 276.5 |
| Carbon derived from binder | 92.5 |
| Weight of binder 2×92.5 | 185.0 |

The above weights of 2630 gm. $UO_{2.18}$, 276.5 gm. C and 185 gm. binder, were mixed until well blended, pressed to consolidate the mixture for handling and heated in a vacuum-tight furnace to decompose the binder and further consolidate the mixture. The furnace was pumped during the heating.

The material was then fed gradually into a vacuum-tight arc furnace where it was reacted using the heat of an electric arc between a graphite electrode 25 and the puddle of fused UC. The arc is moved to the far side 41 of the molten pool 45 as new material is fed into the near side of the pool. The arc may be moved by moving the electrode 21 manually or by a magnetic field. In this manner unreacted material contacts the molten pool of UC without direct impingement of the arc flame.

Typical arc parameters are:

Atmosphere: Argon at start, argon+CO after start
Pressure: Atmospheric to slight vacuum under continuous pumping
Power: About 700 amps at about 35 volts arc potential The above described batch was reacted to a satisfactory uranium carbide in about three or four hours.

Carbon analyses for the above batch were 4.80% C
4.81% C
4.90% C

Because of the unavailability of sufficiently large intermediate heating equipment only relatively small batches could be treated in accordance with the specific aspects of this invention. But the treatment of these small batches establish that the above three kilogram batch could be reacted in about one hour in the practice of the specific aspects of this invention.

While a preferred embodiment of this invention has been disclosed herein, many modifications thereof are feasible. This invention then is not to be restricted except insofar as is necessitated by the prior art.

I claim as my invention:

1. The method of making uranium carbide from uranium oxide which comprises forming a mass of said uranium oxide, carbon, and a binder, heating said mass at a high temperature in the absence of air to decompose the binder, reacting the resulting mass in a first reaction in a non-reactive atmosphere at 2000° to 2300° C. for a time interval depending upon the magnitude of the mass to produce uranium carbide and carbon monoxide while continuously pumping the region of said resulting mass to remove said carbon monoxide, and reacting the product of said first reaction in a second reaction in an arc between a non-consumable electrode and a cooperative electrode while continuously pumping the region of said product to remove the carbon monoxide formed to complete the formation of the uranium carbide, the relationship of the carbon and the uranium oxide in said mass being set so as to be stoichiometric in said first and second reactions in compliance with the chemical equation governing the formation of the uranium carbide.

2. The method of making uranium carbide from uranium oxide which comprises forming a mass of said uranium oxide, carbon and a hydrocarbon binder, heating said mass at about 900° C. in a vacuum to decompose the binder, reacting the resulting mass in a first reaction in a non-reactive atmosphere at 2000° C. to 2300° C. for a time interval depending on the magnitude of the mass to produce uranium carbide and carbon monoxide while continuously pumping the region of said resulting mass to remove said carbon monoxide, said uranium carbide being porous, and reacting the product of said first reaction in a second reaction in an arc between a non-consumable electrode and a cooperative electrode, while continuously pumping the region of said product to remove carbon monoxide formed, to produce highly dense uranium carbide, the relationship of the carbon and the uranium oxide in the mass being set so as to be stoichiometric in said first and second reactions in compliance with the chemical equation governing the formation of the uranium carbide.

3. The method of making uranium carbide from uranium oxide which comprises forming a mass of said uranium oxide, carbon and a hydrocarbon binder, heating said mass at about 900° C. in a vacuum to decompose the binder, reacting the resulting mass in a first reaction in a non-reactive atmosphere at 2000° C. to 2300° C. for a time interval depending on the magnitude of the mass to produce uranium carbide and carbon monoxide while continuously pumping the region of said resulting mass to remove said carbon monoxide, said uranium carbide being porous, and reacting the product of said first reaction in a second reaction in an arc between a non-consumable electrode and a cooperative electrode, while continuously pumping the region of said product to remove carbon monoxide formed, to produce highly dense uranium carbide, the relationship of the carbon and the uranium oxide in the mass being set so as to be stoichiometric in said first and second reactions in compliance with the chemical equation governing the formation of the uranium carbide, the current conducted by said arc being about 700 amperes and the voltage across said arc being about 30 volts.

4. The method of making uranium carbide from uranium oxide which comprises forming a mass of said uranium oxide, carbon, and a binder, heating said mass at a high temperature in the absence of air to decompose the binder, reacting the resulting mass in a first reaction in a non-reactive atmosphere at 2000° C. to 2300° C. for a time interval depending on the magnitude of the mass to produce uranium carbide and carbon monoxide while pumping the region of said resulting mass to remove continuously said carbon monoxide, and reacting the product of said first reaction in a second reaction in an arc between a non-consumable electrode and a cooperative electrode while pumping the region of the arc to remove any residual gas to complete the formation of the uranium carbide, the relationship of the carbon and the uranium oxide in said mass being set so as to be stoichiometric in said first and second reactions in compliance with the chemical equation governing the formation of the uranium carbide.

5. The method of making uranium carbide from uranium oxide which comprises forming a mass of said uranium oxide, carbon, and a hydrocarbon binder, heating said mass in the absence of air at so high a temperature as to decompose said binder, reacting the resulting mass in a first reaction in a non-reactive atmosphere at a temperature of about 2000° C. to 2300° C. for a time interval depending on the magnitude of the mass to produce uranium carbide and carbon monoxide while pumping the region of said resulting mass to remove continuously said carbon monoxide, firing an arc between a non-consumable electrode and a cooperative electrode, and feeding the product of said first reaction gradually into said arc to react said product in a second reaction while pumping the region of the arc to remove any residual gas to complete the formation of the uranium carbide, the relationship of the carbon on the uranium oxide in said mass being set so as to be stoichiometric in said first and second reactions in compliance with the chemical equation governing the formation of the uranium carbide.

6. The method of making uranium carbide from uranium oxide which comprises producing a mass of uranium oxide and carbon, reacting said mass in a first reaction in a non-reactive atmosphere at 2000° C. to 2300° C. for a time interval depending on the magnitude of said mass to produce uranium carbide and carbon monoxide while pumping the region of said mass to remove continuously said carbon monoxide, and reacting the product of said first reaction in an arc between a non-consumable electrode and a cooperative electrode, to complete the formation of the uranium carbide, while pumping the region of said arc to remove any residual gas the relationship of the carbon and uranium oxide in said mass being set so as to be stoichiometric in said first and second reactions in compliance with the chemical equation governing the formation of uranium carbide from said oxide and carbon.

7. The method of making uranium carbide from uranium oxide which comprises producing a mass of uranium oxide and carbon, firing an arc between a non-consumable electrode and a cooperative electrode in a vacuum-tight arc furnace and reacting said uranium oxide and carbon by feeding said mass gradually into said arc at a rate such that said arc remains stable while continuously pumping said arc furnace, a pool of carbide being produced as said reaction proceeds, and the addition of new material from said mass to said arc being to one side of said pool while said arc is moved to the other side of said pool, the relationship of the carbon to the uranium oxide in said mass being stoichiometric in compliance with the chemical equation governing the formation of uranium carbide from said oxide and carbon.

References Cited by the Examiner
UNITED STATES PATENTS
2,905,552   9/1959   Holden et al. _____ 23—14.5

OTHER REFERENCES

Accary, et al.: Nuclear Power, vol. 5, No. 50, June 1960, pages 122–123.

AEC Document NAA–SR–4904, March 15, 1960, pages 3–5.

AEC Document BMI–1370, August 21, 1959, pages 3–5.

AEC Document NYO–2691, Feb. 10, 1961, pages 17–26.

Mallett et al.: J. Electrochemical Society, vol. 99, No. 5, May 1952, pages 197–198.

Webster's New International Dictionary, 2nd edition, G. & C. Merriam Co., 1939, page 2559.

References Cited by the Applicant
UNITED STATES PATENTS
1,523,103   1/1925   D'Adrian.
2,448,479   8/1948   Wilhelm et al.

OTHER REFERENCES

AEC Report BMI–1309, pp. 1–16, Jan. 2, 1959.

Powess et al.: Nuclear Science Abstracts, vol. 12, Abstract 11387, Sept. 15, 1958.

Report SCNC–241, June 27, 1957, declassified Aug. 6, 1957.

Murray: "Second Int. Conference on Peaceful Uses of Atomic Energy," vol. 6, pp. 538, 543, 544, Sept. 13, 1958.

Bernes et al.: Metallurgy and Fuels—Progress in Nuclear Energy, Series V, pp. 435–447, September 1956.

AEC Report NYO–2685, Quarterly Progress Report, Oct. 1 to Dec. 31, 1959, issued Jan. 27, 1960, pp. 25, 31, 33, 37, 39.

AEC Report BMI–1441, p. 61, May 31, 1960.

LEON D. ROSDOL, *Primary Examiner.*

CARL D. QUARFORTH, *Examiner.*

J. D. VOIGHT, L. A. SEBASTIAN, *Assistant Examiners.*